United States Patent
Niwa

(10) Patent No.: US 6,867,386 B1
(45) Date of Patent: Mar. 15, 2005

(54) WELDING STATE DETECTING AND TRANSMITTING DEVICE FOR RESISTANCE-WELDING MACHINE

(75) Inventor: Kazuhiko Niwa, Nishikasugai-gun (JP)

(73) Assignee: Nadex, Co. Ltd., Aichi (JP)

( * ) Notice: Subject to any disclaimer, the term of this patent is extended or adjusted under 35 U.S.C. 154(b) by 0 days.

(21) Appl. No.: 10/663,473

(22) Filed: Sep. 15, 2003

(51) Int. Cl.$^7$ ............................................. B23K 11/25
(52) U.S. Cl. ...................................................... 219/109
(58) Field of Search ................................. 219/109, 110, 219/130.01

(56) References Cited

U.S. PATENT DOCUMENTS 6,018,136 A * 1/2000 Ohmi et al. ............. 219/130.1
6,072,146 A * 6/2000 Matuschek et al. ......... 219/110

FOREIGN PATENT DOCUMENTS

| JP | 8-099181 | | 4/1996 |
| JP | 10-305366 | * | 11/1998 |
| JP | 2003-191079 | | 7/2003 |

* cited by examiner

Primary Examiner—Clifford C. Shaw
(74) Attorney, Agent, or Firm—Orrick Herrington & Sutcliffe, LLP

(57) ABSTRACT

The welding state detecting and transmitting device 40 is provided with a secondary battery 60 for accumulating power to be supplied to components within the device 40, a charging circuit 58 that utilizes a portion of the welding current to charge the secondary battery 60. A toroidal coil 42 is used for charging the secondary battery 60 with welding current. The troidal coil 42 is attached to secondary side conductor 32 and connected with the charging circuit 58. The device 40 wirelessly transmits data relating to the welding current detected by the toroidal coil 46. The device 40 substantially reduces the burden of maintenance of the device 40 required in prior art such as replacing a primary battery or recharging a rechargeable battery periodically.

12 Claims, 2 Drawing Sheets

WELDING STATE DETECTING AND TRANSMITTING DEVICE FOR RESISTANCE-WELDING MACHINE

FIELD OF THE INVENTION

The present invention relates to a device for detecting welding state indices such as welding current, welding pressure, welding time (including indices relating thereto), etc. of a resistance-welding machine, and for wirelessly transmitting data to an external device based on the detected indices.

BACKGROUND OF THE INVENTION

A welding state detecting and recording device is known to the art. The known device is provided with a toroidal coil for detecting indices relating to welding current of a resistance-welding machine, and a data storing means for storing data based on the indices detected by the toroidal coil. The toroidal coil and the data storing means are connected by a long cable (first prior art).

Further, Japanese Laid Open Patent Publication (TOKKAIHEI) 8-99181 discloses a welding state detecting and transmitting device. The device is utilized after being attached to a secondary side of a resistance-welding machine. The welding state detecting and transmitting device is provided with a toroidal coil for detecting welding current indices of the resistance-welding machine, and a transmitting means for wirelessly transmitting data based on the indices detected by the toroidal coil to an external device for processing received data (second prior art).

In the case of the first prior art, the toroidal coil must be attached to a welding gun (a secondary side) of the resistance-welding machine. The welding gun is moved in accordance with a welding point within a work to be welded. Attaching the toroidal coil, being connected to the cable, to the movable welding gun often causes a problem that, as the welding gun is moved around the work, the long cable connected to the toroidal coil is to catch on or become entangled with the work or the other members. This causes the cable to be severed, or damaging the work or the other members. Further, it is even more likely that the cable will catch on or become entangled with the work when the welding gun is caused to move sequentially around the work so as to weld a plurality of points. Therefore, it is difficult to adopt the first prior art in an industrial application.

The device of the second prior art wirelessly transmits the data to the external device, thereby resolving the problem in the first prior art that may be caused by the long cable between the toroidal coil and the data recording means.

DISCLOSURE OF THE INVENTION

In the second prior art, each component of the welding state detecting and transmitting device, including a wireless transmitting means, must be supplied with electric driving power. If the welding state detecting and transmitting device of the second prior art is connected to a commercial power source or the like means by an electrical cable for obtaining electric driving power from the commercial power source or the like means, the advantages of the second prior art for wirelessly transmitting data to the external device are lost. Consequently, a replaceable primary battery or a rechargeable secondary battery must be prepared within the welding state detecting and transmitting device for obtaining the electric driving power. If the primary battery is used within the device of the second prior art, the primary battery must be replaced every time it is exhausted. If the rechargeable secondary battery is used, the secondary battery must be connected to the commercial power source or the like means for recharging the battery every time it is exhausted.

The secondary side (welding gun) of the resistance-welding machine is normally located at a tip portion of a welding robot or an interior of a welding jig or the like. Consequently, physically accessing to the welding state detecting and transmitting device attached to the secondary side is troublesome. Replacing batteries or recharging batteries within the device is also troublesome.

Further, in the second prior art, in a case where the conditions for detecting welding state indices should be changed, in a case where the conditions for transmitting the detected data to the external device should be changed, or in a case where a program for operating the welding state detecting and transmitting device is to be rewritten, the welding state detecting and transmitting device must be accessed physically by an operator.

Accessing physically by the operator to the welding state detecting and transmitting device attached to the secondary side of the resistance-welding machine is troublesome. Therefore, maintenance operations, such as changing detecting conditions, changing transmitting conditions, or rewriting operating program constitute a considerable burden.

Thus maintenance operations of the second prior art are considerable burden, and it is desirable to substantially reduce this burden.

Further, in the second prior art, the data transmitted from the welding state detecting and transmitting device may not be received by the external device. Wireless transmitting and receiving technique is often influenced by circumstances and failure of data transmission cannot be perfectly prevented. The second prior art lacks reliability.

The first object of the present invention is to substantially reduce the burden of maintenance operations of the welding state detecting and transmitting device, such as replacing the primary battery, recharging the secondary battery, changing detecting conditions, changing transmitting conditions, or rewriting operating program, etc. of the welding state detecting and transmitting device.

The second object of the present invention is to allow necessary data to easily be obtained from the welding state detecting and transmitting device even in cases where the external device fails to receive the transmitted data from the welding state detecting and transmitting device.

The present invention aims to solve at least a one of the above two objects.

The present invention creates a new welding state detecting and transmitting device. The welding state detecting and transmitting device of the present invention is utilized after being attached to a secondary side of a resistance-welding machine. The device of the present invention is provided with an electricity storage means for accumulating electric power to be supplied to components within the device, and a charging means for charging the electricity storage means, the charging means utilizing a portion of welding current supplied through the secondary side of the resistance-welding machine. The device of the present invention is further provided with a sensor for detecting welding state indices, and a transmitting means for wirelessly transmitting data based on the detected indices to an external device.

Some examples of 'wireless transmission' are the radio method, whereby the data is transmitted via radio waves, and the infrared ray method, whereby the data is transmitted utilizing infrared rays, etc.

The present invention effectively solves the problem of the prior art (the need to perform maintenance operations such as replacing the primary battery or connecting the secondary battery to a commercial power source or the like means and recharging it every time the driving power is exhausted, etc.) by efficiently utilizing characteristics inherent to the resistance-welding machine.

The present invention also realizes a new welding state detecting system. The new welding state detecting system is provided with the welding state detecting and transmitting device of the present invention, and an external device. The external device has a wireless receiving means for receiving data that has been wirelessly transmitted, and a processing means for processing the received data. The processing means generates and outputs the processed data.

According to the system, the external device and the welding state detecting and transmitting device communicate wirelessly, so the external device can be moved without a concern that a connecting cable will be severed or will damage or destroy a work or the other components. In addition, the external device outputs useful data for monitoring the resistance-welding machine, or for effectively controlling the resistance-welding machine.

Further, the present invention creates a new welding state detecting and controlling system. The new detecting and controlling system may be provided with the welding state detecting and transmitting device and a controlling device of a resistance-welding machine. The controlling device has a receiving means for receiving data that has been wirelessly transmitted, and a control means for controlling the progress of welding state of the resistance-welding machine based on the data received by the receiving means.

According to this system, the progress of the welding state by the resistance-welding machine can be feedback controlled based on data from the welding state detecting and transmitting device. As a result, accurate resistance-welding operation can be achieved.

The present invention also creates a new welding state detecting system. The new detecting system may be provided with the welding state detecting and transmitting device, and a welding state monitoring device. The welding state monitoring device has a receiving means for receiving data that has been wirelessly transmitted, and a displaying means for displaying the welding state of the resistance-welding machine based on the data received by the receiving means.

According to this system, the welding state of the resistance-welding machine can be monitored easily.

The welding state detecting and transmitting device of the present invention may be provided with a sensor for detecting welding state indices, a controlling means for controlling detection by the sensor in accordance with detecting conditions, a transmitting means for wirelessly transmitting data based on the indices detected by the sensor, and a receiving means for receiving data wirelessly transmitted from an external device. The detecting conditions used by the controlling means are capable of being rewritten to a newly received data describing a new detecting conditions. The new data describing the new detecting conditions is transmitted wirelessly from the external device and received by the receiving means.

The present device eliminates the necessity of troublesome maintenance operations, such as physically accessing to the device attached to the secondary side of the resistance-welding machine, removing the device from the secondary side and rewriting detecting conditions, etc. Consequently, the burden of maintenance operations can be substantially reduced.

A welding state detecting and transmitting device of the present invention may be provided with a storing means for storing programs for operating the welding state detecting and transmitting device, and a receiving means for receiving operating programs wirelessly transmitted from an external device. The operating programs stored in the storing means are capable of being rewritten with a new operating program transmitted wirelessly from the external device and received by the receiving means.

The present device eliminates the necessity of troublesome maintenance operations, such as physically accessing to the device attached to the secondary side of the resistance-welding machine, removing the device from the secondary side and rewriting the operating programs. Consequently, the burden of maintenance of the operating programs for the device can be substantially reduced.

A welding state detecting and transmitting device of the present invention may be provided with a receiving means for receiving a data demanding signal wirelessly transmitted from the external device, a controlling means capable of controlling the extraction of the requested data from a data storing means, and a transmitting means for wirelessly transmitting the extracted data to the external device.

According to the present device, in cases where the external device fails to receive the necessary data from the welding state detecting and transmitting device, the failed data can be recollected from the welding state detecting and transmitting device.

The term 'means' in the present specification is not restricted to hardware, but also includes combinations of hardware and software. Further, one function of one means may be realized through the use of two or more items of hardware or software, or the two or more functions of the two or more means may be realized through the use of one item of hardware or software. For example, the transmitting means and the receiving means may be realized through one item of hardware such as the transmitting and receiving circuit.

PREFFERED EMBODIMENT OF THE INVENTION (FIRST EMBODIMENT)

Figure 1:
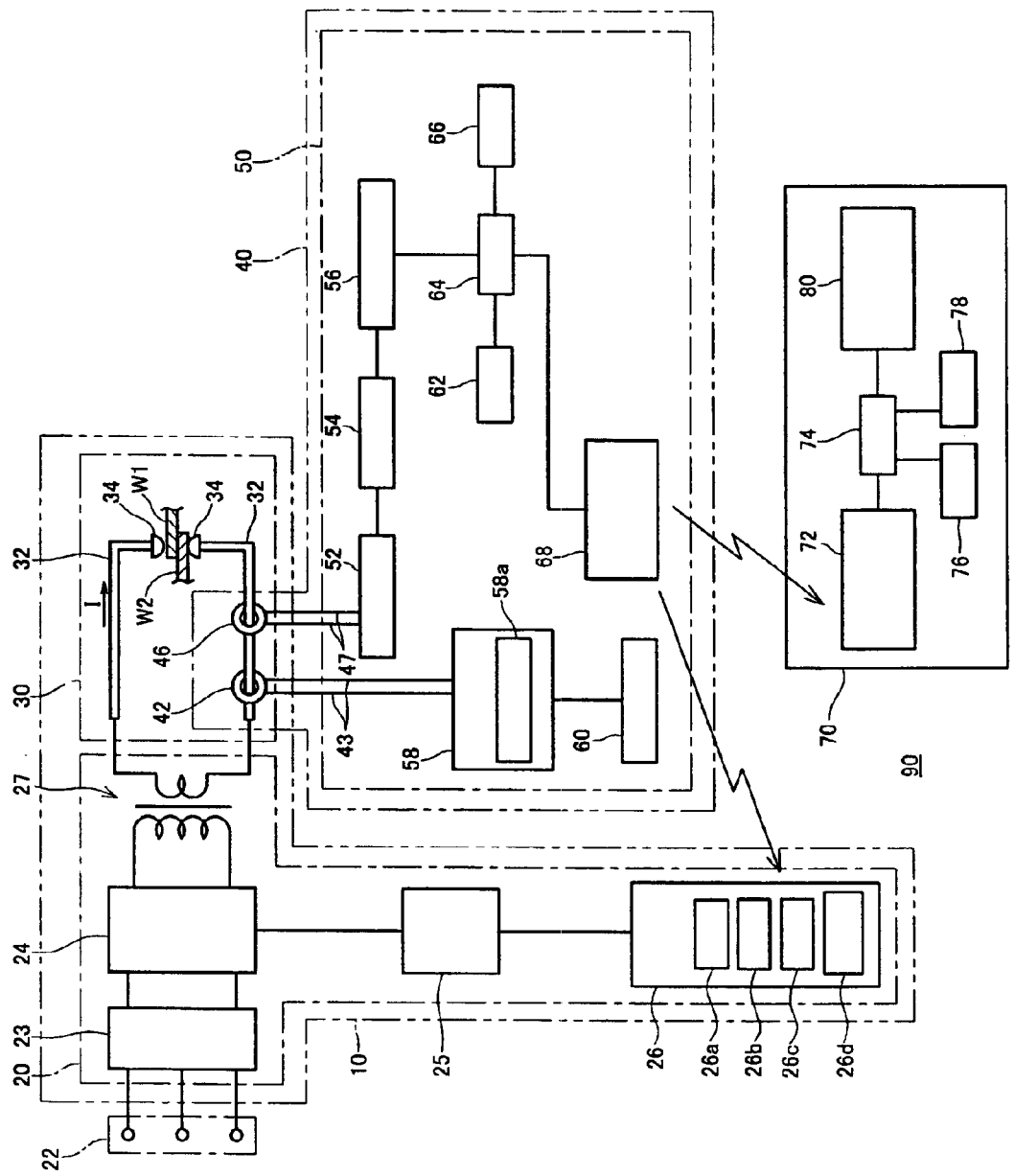
FIG. 1 is an explanatory view showing a welding state detecting and transmitting device and a welding state detecting system of a first embodiment.

FIG. 1 is an explanatory view showing a welding state detecting and transmitting device 40 of a first embodiment, and a welding state detecting system 90. The system 90 is provided with a resistance-welding machine 10, the welding state detecting and transmitting device 40, and an external device 70 for receiving data from the device 40, storing the received data, processing the received data, storing the processed data, and outputting the received and the processed data.

The resistance-welding machine 10 is provided with a circuit unit 20 and a welding gun unit 30. The circuit unit 20 is provided with a commutating circuit 23, an inverter circuit 24, and a transformer 27, these being connected in sequence. The commutating circuit 23 is connected with a commercial three-phase alternating current source 22. The circuit unit 20 is further provided with a driving circuit 25 connected with the inverter circuit 24, and a welding state controlling device 26 connected with the driving circuit 25. The welding state controlling device 26 has a CPU 26a, a ROM 26b, a RAM 26c, and a monitor 26d, etc. The welding gun unit 30 is provided with a pair of secondary side conductors 32 connected with a secondary side of the transformer 27 of the circuit unit 20, and a pair of welding electrodes 34, the welding electrodes 34 being attached to the tips of the secondary side conductors 32. The secondary side conductors 32 of the welding gun unit 30 are capable of freely moving by means of an actuator (not shown), in a direction of applying pressure on a work (to-be-welded members W1 and W2).

The welding state detecting and transmitting device 40 is provided with a circuit unit 50, a toroidal coil 46 for detecting welding current, and a toroidal coil 42 for charging a rechargeable battery 60 by using a portion of welding current. The circuit unit 50 and the toroidal coils 46 and 42 are unified by being connected by cables 43 and 47, these having a short length such that they do not impede the operation or movement of the welding gun unit 30. One of the secondary side conductors 32 of the welding gun unit 30 is inserted through a hollow center hole of the circular toroidal coil 46. The toroidal coil 46 generates voltage that is proportional to changing rate of welding current. The same secondary side conductor 32 of the welding gun unit 30 is inserted through a hollow center hole of the circular toroidal coil 42. The toroidal coil 42 generates voltage due to welding current.

The circuit unit 50 is provided with a gain circuit 52, an integrated circuit 54, an A/D conversion circuit 56, a CPU 64, and a data transmitting and receiving circuit 68, these being connected in sequence. A RAM 62 and a ROM 66 are also connected with the CPU 64. By utilizing, for example, a widely used short-range wireless communication module (a Bluetooth module or the like), the data transmitting and receiving circuit 68 may be manufactured easily at low cost.

The circuit unit 50 is further provided with a charging circuit 58 and a secondary battery (a rechargeable battery, for example a lithium ion battery) 60 that is connected with the charging circuit 58. The charging circuit 58 is connected with the toroidal coil 42 for obtaining charging voltage from the welding current. The toroidal coil 42 is attached to the welding gun unit 30 in the same way as the toroidal coil 46. The toroidal coils 42 and 46 can also constitute one shared toroidal coil. Electric driving power is supplied from the secondary battery 60 to all components of the welding state detecting and transmitting device 40. Moreover, the circuit unit 50 is also provided with a timer (not shown) utilized for counting welding time, and a pressure detecting means (not shown) utilized for detecting wielding pressure between the electrodes 34, 34.

The charging circuit 58 is provided with a charging control member 58a. The charging control member 58a performs various controls concerning charging. Some examples are:

(1) The charging control member 58a controls the charging current of the secondary battery 60 to be constant. In this manner, excessive current or excessive voltage is prevented from being applied to the secondary battery 60.

(2) When the quantity of electric power accumulated in the secondary battery 60 reaches or exceeds a specified value, the charging control member 58a halts the charging of the secondary battery 60. Excessive charging power is not supplied to the secondary battery 60.

(3) When the quantity of electric power accumulated in the secondary battery 60 is at or below a specified value, the charging control member 58a causes the secondary battery 60 to be charged utilizing a portion of welding current. This aspect prevents situations where the quantity of electric power accumulated in the secondary battery 60 is insufficient and thereby halts the operation of the device 40.

The CPU 64 controls the circuit unit 50 in accordance with prescribed detecting conditions stored within the RAM 62. Examples of detecting conditions include the detecting period (start time to finish time) of the welding state indices, detecting intervals, type of resistance-welding machine (AC welder, inverter welder); detecting range (100 A ~1000 A, 1000 A ~10,000 A, 10,000 A ~100,000 A), etc.

The CPU 64 also controls the data transmitting and receiving circuit 68 in accordance with prescribed transmitting conditions stored within the RAM 62. Examples of transmitting conditions include the transmitting intervals, and transmitting power.

Operating programs for the device 40 are stored within the RAM 62. A variety of programs with differing contents are stored. Examples of the operating programs include a program for processing the detected value by the toroidal coil 46 (calculating mean values or effective values, etc.), a program for defining the operating conditions of the data transmitting and receiving circuit 68, a program for controlling the charging control member 58a of the charging circuit 58, etc.

Further, the RAM 62 is capable of storing the previous 10,000 multipoint items of welding status indices (welding current, mean welding current, mean welding voltage, pressures between the pair of electrodes 34,24 and welding time at each previous welding point). The welding status indices detected or processed from the detected indices is stored within the RAM 62 each time welding is performed. In the case where the stored welding data exceeds 10,000 multipoint items, the new welding data writes sequentially over the oldest welding data.

The external device 70 for receiving welding status indices, processing the received welding status indices, and outputting the received or processed data is provided with a data transmitting and receiving circuit 72, a CPU 74, and a data outputting circuit 80, these being connected in sequence. A RAM 76 and a ROM 78 are also connected with the CPU 74. Examples of a data outputting device 70 are mobile telephones, personal computers, or PDAs (Personal Digital Assistants), etc. The portability of mobile telephones is high, however, the processability and storage capacity thereof is usually low, therefore, mobile telephones are suitable for monitoring received welding data (welding current values, etc.). Personal computers, and PDAs, etc. usually have a large processability and storage capacity, therefore, personal computers, and PDAs, etc. are suitable for graphic displaying the received welding data, analyzing the received welding data, storing the received welding data, and inputting the new detecting and transmitting conditions based on the results of data analysis, etc. Welding current data for a plurality of resistance-welding machines, corresponding to several thousand multipoint items, can easily be stored using a personal computer, and PDA, etc.

According to the system 90 of the first embodiment, the welding data detected, processed or analyzed by the welding state detecting and transmitting device 40 can be utilized simultaneously by a plurality of data outputting devices 80 (mobile telephones, personal computers, and PDAs, etc.).

The data transmitting and receiving circuit 72 preferably utilizes, for example, a widely utilized short-range wireless communication module (a Bluetooth module or the like). It is expected that mobile telephones having short-range wireless communication modules loaded therein will become widespread. The transmitted data from the device 40 may be easily monitored by bringing the mobile telephone to the vicinity of the device 40. The mobile telephone may be used as the external device 70.

The operation of the welding state detecting system 90 of the first embodiment will now be described. The commutating circuit 23 of the resistance-welding machine 10 rectifies the three-phase alternating voltage from the commercial three-phase alternating current source 22 and outputs direct voltage. The inverter circuit 24 contains a switching element. The inverter circuit 24 obeys controlling pulses from the welding state controlling device 26, conveyed via the driving circuit 25, to discontinuously perform high-frequency switching, thereby converting the direct input voltage from the commutating circuit 23 into a high-frequency alternating pulse that is output therefrom. The alternating pulse output from the inverter circuit 24 is supplied to a primary side coil of the welding transformer 27. As a result, an alternating pulse similar to that of the primary side coil is output to a secondary side coil of the welding transformer 27. The current generated by the secondary side coil of the transformer 27 is increased so that large amount of joule heat is generated while the welding current passes through the work W1 and W2.

The secondary side alternating pulses, that is, a welding current 1, flows into the pair of welding electrodes 34 via the pair of secondary side conductors 32. In this manner, the welding current 1 that has flowed into the welding electrodes 34 is supplied to the work W1 and W2 (to-be-welded members W1 and W2), and the joule heat is created within the work W1 and W2 thereby resistance-welding the work W1 and W2 by the joule heat.

The toroidal coil 46 detects the magnitude of the welding current 1. The toroidal coil 46 is a part of the welding state detecting and transmitting device 40. The toroidal coil 46 outputs a signal corresponding to an amount of change of the welding current 1 per a unit time. Since the signal indicates changing rates of the welding current 1, the signal itself does not indicate the magnitude of the welding current 1. Consequently, the signal, indicating changing rates of the welding current 1, is first input into the gain circuit 52 of the circuit unit 50 to be amplified, then is input into the integrated circuit 54 and integrated, then is output. The integrated value corresponds to the magnitude of the welding current 1.

The signal outputted from the integrated circuit 54, corresponding to the welding current 1 and suitable for processing and analysis, is first input into the A/D conversion circuit 56 and is converted into digital data. Then the converted digital data is input into the CPU 64. The CPU 64 processes and analyzes the received welding status indices and generates useful data such as indices that will make the next resistance-welding to be performed effectively. When necessary, the CPU 64 reads the data from the RAM 62 and the ROM 66 for processing and analyzing, and the processed and analyzed data is stored within the RAM 62 and the ROM 66. The data that has been detected, processed and analyzed by the CPU 64 is wirelessly transmitted from the data transmitting and receiving circuit 68 to the external device 70 and the resistance-welding machine 10. The resistance-welding machine 10 may be considered as one of the external device.

Furthermore, the CPU 64 also controls the data transmitting and receiving circuit 68. For example, the CPU 64 controls the timing of transmitting data, and controls the data to be transmitted, etc.

In the case where the wirelessly transmitted data is received by the data transmitting and receiving circuit 72 of the external device 70, the data is first input into the CPU 74. The CPU 74 processes and analyzes the received data and generates useful data such as indices that will make the next resistance-welding to be performed effectively or that will help understanding of the history of resistance-welding operations. When necessary, the CPU 74 reads the data from the RAM 76 and the ROM 78 for processing and analyzing, and the processed and analyzed data is stored within the RAM 76 and the ROM 78.

The processed and analyzed data by the CPU 74 is output (displayed, printed, etc.) by the data outputting circuit 80.

Further, in the case where the data wirelessly transmitted from the welding state detecting and transmitting device 40 is received by the welding state controlling device 26 of the resistance-welding machine 10, the wirelessly transmitted data is output to the monitor 26d. This monitor display 26d allows the welding states indices from the device 40 to be seen easily. Moreover, after the wirelessly transmitted data has been received, the CPU 26a outputs control signals to the driving circuit 25 on the basis of the wirelessly transmitted data. By performing this type of feedback adjustment based on the wirelessly transmitted data, accurate resistance-welding can be achieved by the resistance-welding machine 10. Further, the wirelessly transmitted data that has been received may be stored in the ROM 26b or RAM 26c.

The device 40 and the device 70 are provided with the data transmitting and receiving circuits 68 and 72 respectively. That is, the device 40 has a data receiving function in addition to a data transmitting function, and the device 70 has a data transmitting function in addition to a data receiving function.

The device 70 is capable of transmitting, to the data transmitting and receiving circuit 68 of the welding state detecting and transmitting device 40, data which describes welding state indices detecting conditions (the conditions according to which welding state indices will be detected) and data transmitting conditions (the conditions according to which data will transmitted from the device 40). When the data describing welding state indices detecting conditions and data transmitting conditions is transmitted to the device 40, the CPU 64 stores the data within the RAM 62. Thereafter, the CPU 64 detects welding state indices in accordance with the newly defined detecting conditions, and transmits the detected welding state indices in accordance with the newly defined transmitting conditions.

Further, the device 70 is capable of transmitting operating programs, defining how the device 40 should perform operations, to the data transmitting and receiving circuit 68 of the device 40. After the operation program has been transmitted, the CPU 64 rewrites the operation program stored in the RAM 62. After the new operation program has been rewritten in the RAM 62, the new operation program is executed.

Further, the external device 70 is capable of transmitting a data request signal to the device 40. When the data request signal has been transmitted to the device 40, the CPU 64 extracts the requested data from the RAM 62 and the ROM 66. Then, the CPU 64 controls the transmission of the extracted data from the data transmitting and receiving circuit 68. By using the data request signal, previous welding data that has been failed to receive by the external device 70 may be resent so that the external device 70 is capable to store all necessary data.

(SECOND EMBODIMENT)

Figure 2:
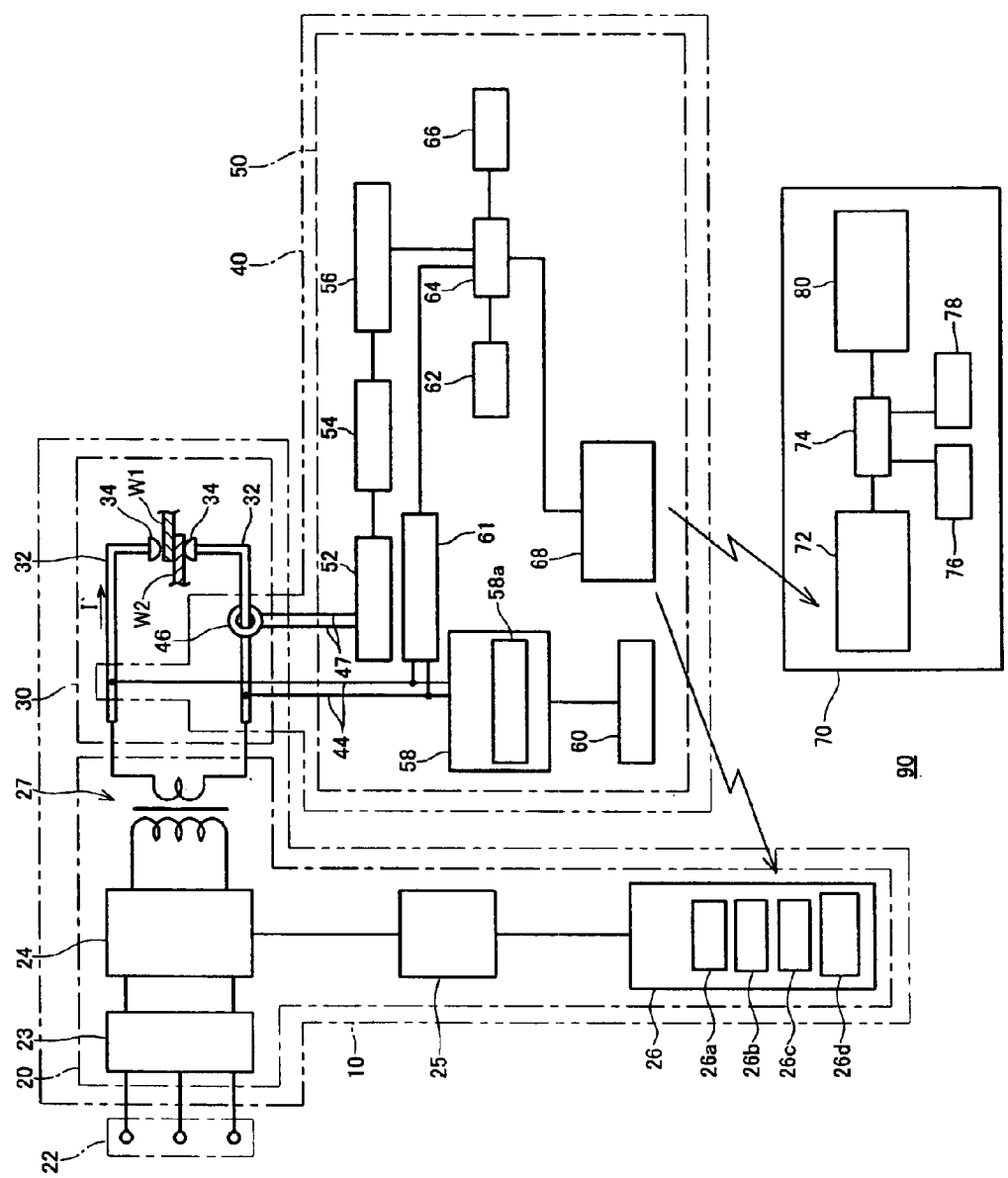
FIG. 2 is an explanatory view showing a welding state detecting and transmitting device and a welding state detecting system of a second embodiment.

FIG. 2 is an explanatory view showing a welding state detecting and transmitting device 40 and a welding state detecting system 90 of a second embodiment.

In this system, a pair of cables 44 is connected with a charging circuit 58 of the device 40. Each of the pair of cables 44 is connected with one of the pair of secondary side conductors 32. Further, the pair of cables 44 bifurcates and is connected with an A/D conversion circuit 61. The A/D conversion circuit 61 is connected with a CPU 64. By this means, voltage data originating from the pair of secondary side conductors 32, 32 can be detected, processed, and analyzed, etc. These points are the main differences of the second embodiment from the first embodiment.

In addition to the functions described above, the welding state detecting and transmitting device 40 of the first or second embodiments also has the following effects.

(1) By using the charging toroidal coil 42 (first embodiment) or cables 44 (second embodiment) and the charging circuit 58, a portion of the welding current automatically charge the secondary battery 60. Frequent battery changing operations or frequent battery recharging operations are not necessary any more. As a result, maintenance operations are extremely easy (substantially maintenance-free).

(2) In the case where a plurality of the welding state detecting and transmitting device of the second prior art is attached to a plurality of individual resistance-welding machines, maintenance operations must be performed on each of the plurality of individual resistance-welding machines, i.e. rewriting detecting and transmitting conditions, and rewriting operation programs, etc., and this is extremely troublesome. In contrast, in the welding state detecting and transmitting device 40 of the first or second embodiments, detecting and transmitting conditions and the operation programs can be rewritten wirelessly from the device 70. The maintenance operations are not time-consuming.

(3) In the case the external device 70 failed to receive the transmitted data from the device 40, the failed data may be resent from the device 40 again by using the data request signal. The external device 70 is capable to store all necessary data.

Specific examples of embodiments of the present invention are presented above, but these merely illustrate some possibilities of the invention and do not restrict the claims thereof. The art set forth in the claims includes variations, transformations and modifications to the specific examples set forth above.

Furthermore, the technical elements disclosed in the present specifications or figures may be utilized separately or in all types of conjunctions and are not limited to the conjunctions set forth in the claims at the time of submission of the application. Furthermore, the art is disclosed in the present specification or figures may be utilized to simultaneously realize a plurality of aims or to realize one of these aims.

What is claimed is:

1. A welding state detecting and transmitting device to be attached to a secondary side of a resistance-welding machine, the device comprising:

an electricity storage means for accumulating electric power to be supplied to components within the device;

a charging means for charging the electricity storage means by utilizing a portion of welding current supplied through the secondary side of the resistance-welding machine;

a sensor for detecting indices relating to welding state; and a transmitting means for wirelessly transmitting data based on the indices detected by the sensor to an external device.

2. A device as set forth in claim 1, wherein electricity storage means, the charging means, the sensor, and the transmitting means are formed in a unified manner.

3. A device as set forth in claim 1, wherein the charging means has a coil provided around a conductor for supplying welding current, the coil being utilized to charge the electricity storage means.

4. A device as set forth in claim 1, wherein voltage between a pair of conductors for supplying welding current is utilized for charging the electricity storage means.

5. A welding state detecting and transmitting device to be attached to a secondary side of a resistance-welding machine, the device comprising:

a sensor for detecting indices relating to welding state;

a transmitting means for wirelessly transmitting data based on the indices detected by the sensor;

a controlling means for controlling detection of welding state indices in accordance with detecting conditions stored within a memory;

a receiving means for receiving data wirelessly transmitted from an external device; and a rewriting means for rewriting detecting conditions stored within the memory with a newly received data by the receiving means.

6. A welding state detecting and transmitting device to be attached to a secondary side of a resistance-welding machine, the device comprising:

a sensor for detecting indices relating to welding state;

a transmitting means for wirelessly transmitting data based on the indices detected by the sensor;

a controlling means for controlling transmission of the detected welding state indices in accordance with transmitting conditions stored within a memory;

a receiving means for receiving data wirelessly transmitted from an external device; and a rewriting means for rewriting transmitting conditions stored within the memory with a newly received data by the receiving means.

7. A welding state detecting and transmitting device to be attached to a secondary side of a resistance-welding machine, the device comprising:

a sensor for detecting indices relating to welding state;

a transmitting means for wirelessly transmitting data based on the indices detected by the sensor;

a controlling means for controlling the welding state detecting and transmitting device in accordance with an operating program stored within a memory;

a receiving means for receiving an operating program wirelessly transmitted from an external device; and a rewriting means for rewriting the operating program stored within the memory with a newly received operating program by the receiving means.

8. A welding state detecting system comprising the welding state detecting and transmitting device as set forth in any one of claim 5, 6 or 7, further comprising an external device for receiving a transmitted data, wherein the external device comprises:

a receiving means for receiving the data wirelessly transmitted from the welding state detecting and transmitting device; and a processing means for processing the received data and generating and outputting the processed data.

9. A welding state detecting and transmitting device to be attached to a secondary side of a resistance-welding machine, the device comprising:

a sensor for detecting indices relating to welding state;

a memory for storing data based on the indices detected by the sensor;

a receiving means for receiving a data request signal wirelessly transmitted from an external device;

a means for extracting the data from the memory in accordance with the received data request signal; and a means for wirelessly transmitting the extracted data to the external device.

10. A welding state detecting system comprising the welding state detecting and transmitting device as set forth in claim 9, and an external device for receiving a transmitted data, wherein the external device comprises:

a means for wirelessly transmitting the data request signal to the welding state detecting and transmitting device;

a receiving means for receiving the data wirelessly transmitted from the welding state detecting and transmitting device; and a processing means for processing the received data and generating and outputting the processed data.

11. A system as set forth in claim 10, wherein the external device further comprises a control means for controlling the resistance-welding machine in accordance with the received data.

12. A welding state detecting device to be attached to a secondary side of a resistance-welding machine, the device comprising:

an electricity storage means for accumulating electric power to be supplied to components within the device;

a charging means for charging the electricity storage means by utilizing a portion of welding current supplied through the secondary side of the resistance-welding machine; and a sensor for detecting indices relating to welding state.

\* \* \* \* \*